United States Patent [19]
Hujsak

[11] Patent Number: 4,783,936
[45] Date of Patent: Nov. 15, 1988

[54] SPACE RAIL FOR LARGE SPACE SYSTEMS

[75] Inventor: Edward J. Hujsak, La Jolla, Calif.

[73] Assignee: General Dynamics Corp./Space Systems Division, San Diego, Calif.

[21] Appl. No.: 929,576

[22] Filed: Nov. 10, 1986

[51] Int. Cl.⁴ .......................................... E04H 12/18
[52] U.S. Cl. ......................................... 52/108; 52/646
[58] Field of Search .................. 52/79.1, 79.5, 646, 52/108, 71, 111, 632, 645

[56] References Cited

U.S. PATENT DOCUMENTS

| | | | |
|---|---|---|---|
| 3,486,279 | 12/1969 | Mauch | 52/108 |
| 3,564,789 | 2/1971 | Vyvyan et al. | 52/646 |
| 3,757,476 | 9/1973 | Schoen | 52/646 |
| 4,527,362 | 7/1985 | Tobey et al. | 52/646 |
| 4,539,786 | 9/1985 | Nelson | 52/645 |
| 4,569,176 | 2/1986 | Hedgepeth et al. | 52/645 |
| 4,578,919 | 4/1986 | Amadon et al. | 52/108 |
| 4,587,777 | 5/1986 | Vasques et al. | 52/645 |
| 4,604,844 | 8/1986 | Mikulas, Jr. et al. | 52/646 |
| 4,633,566 | 1/1987 | Coppa | 52/646 |
| 4,677,803 | 7/1987 | Mikulas, Jr. et al. | 52/632 |

Primary Examiner—Carl D. Friedman
Assistant Examiner—Caroline D. Dennison
Attorney, Agent, or Firm—John R. Duncan; Frank D. Gilliam

[57] ABSTRACT

A space rail (10) having two basic elements, a box structure (12) which is configured to permit installation of payload hardware and payload services hardware along its length and a deployable back structure (14) which provides stiffness to the assembly of space rails when deployed. The box structure (10) is preferably a flat rectangular frame comprising body members (12) and the back structure (14) comprises a plurality of struts (24a-d, 30) pivotally attached to the body member (14) and to each other so as to fold into a retracted deployable position and to be deployed (unfolded) by a suitable mechanism.

9 Claims, 2 Drawing Sheets

U.S. Patent Nov. 15, 1988 Sheet 1 of 2 4,783,936
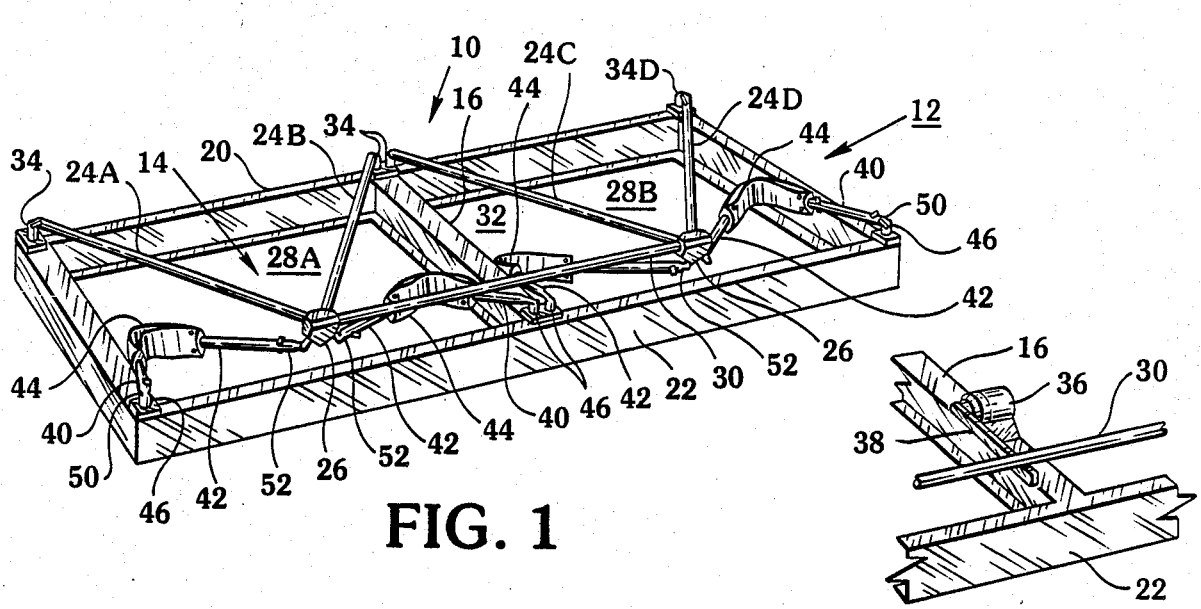
FIG. 1
FIG. 1A
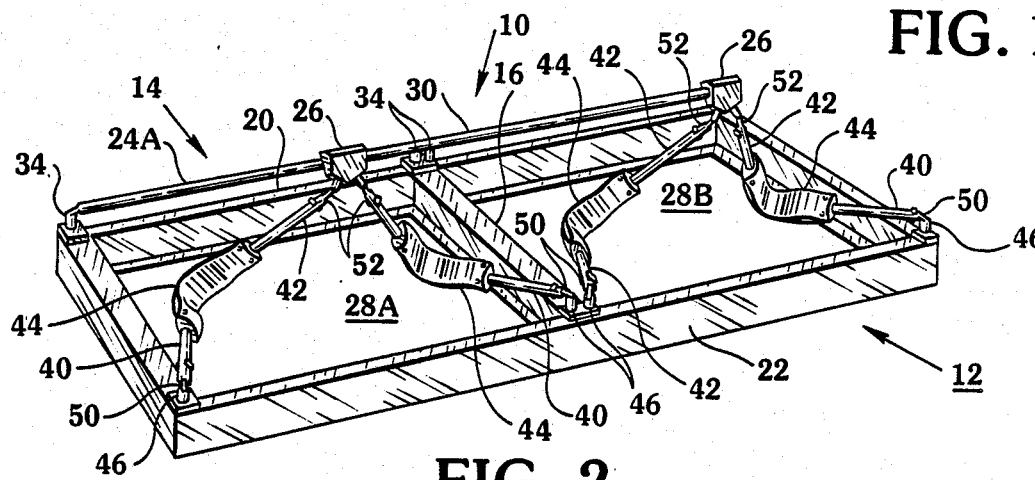
FIG. 2
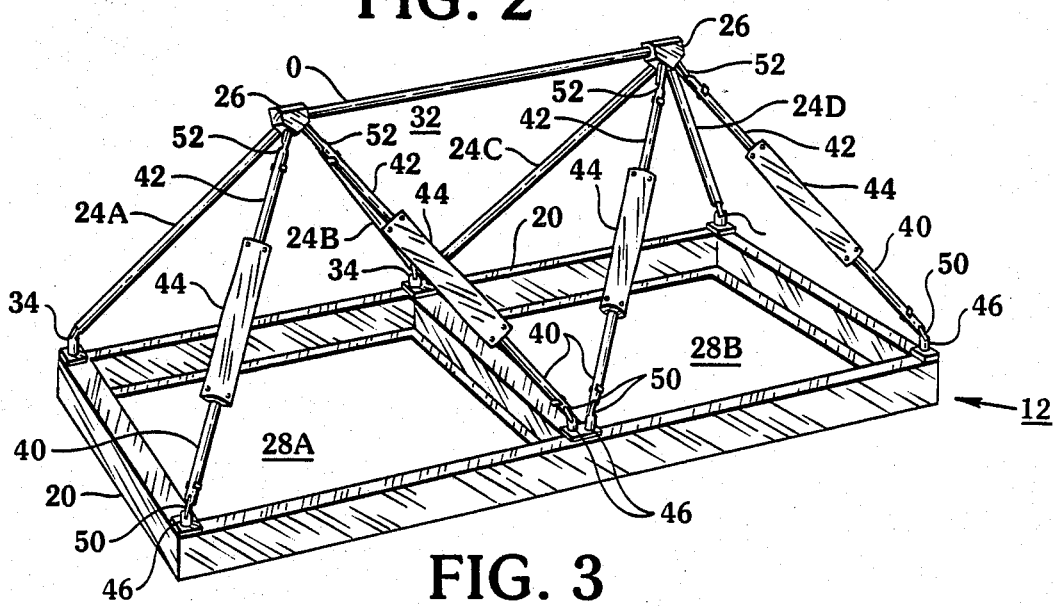
FIG. 3

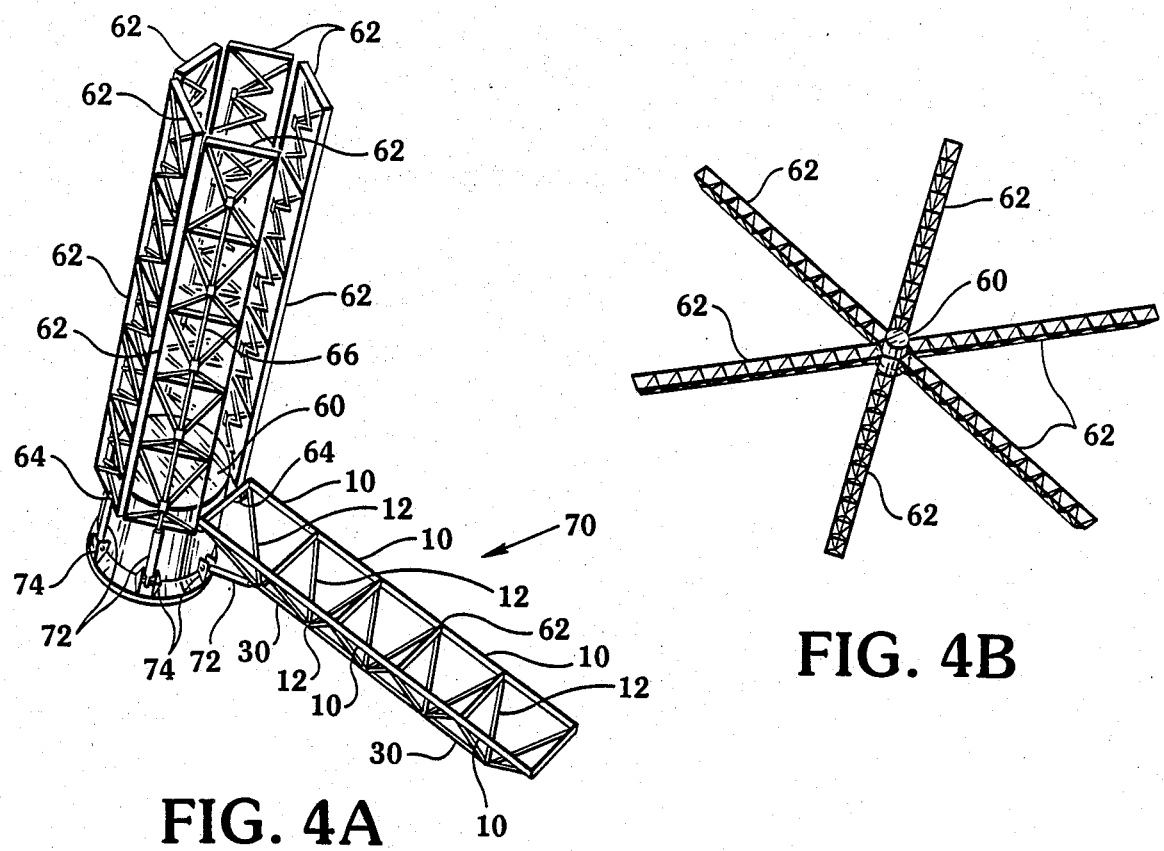
FIG. 4A
FIG. 4B
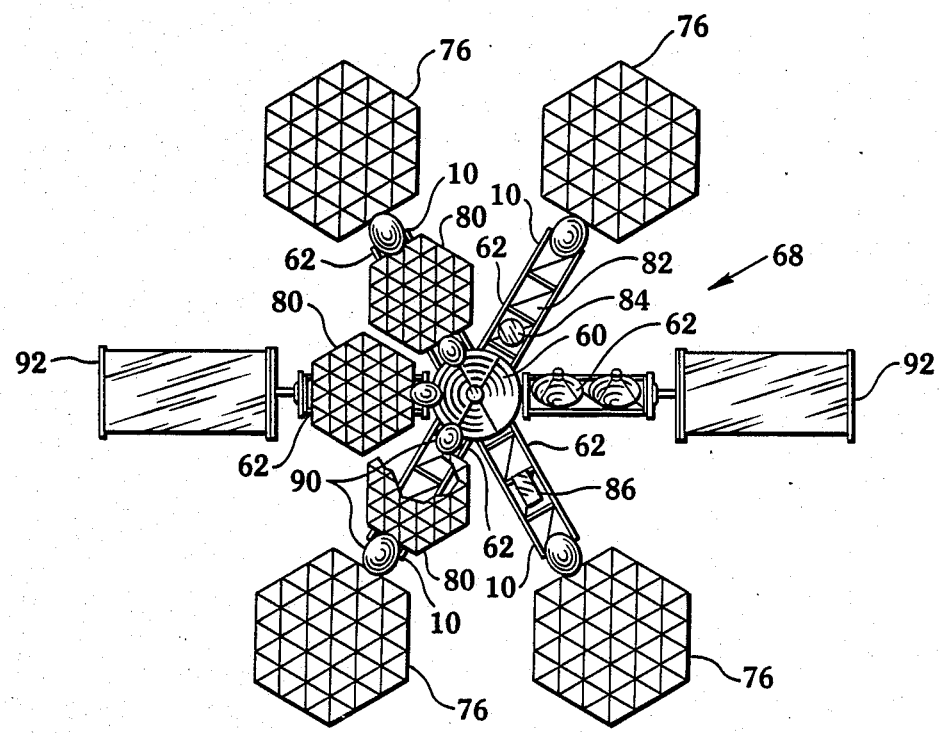
FIG. 5

SPACE RAIL FOR LARGE SPACE SYSTEMS

BACKGROUND OF THE INVENTION

This invention relates to space systems and is specifically directed to structural elements suitable for construction of large space systems.

The purpose of structural elements, such as struts, truss beams, extendable masts, etc., is to provide support for payload equipment and payload services, such as power and thermal control.

A common payload constraint is the volume available within the cargo bay of the carrier vehicle. It is desirable, therefore, to fold, or articulate, those elements of the payload, such as support structure, that are amenable to occupy the smallest possible volume, with full deployment once the payload has reached orbit.

It is also recognized that the installation of such equipment in space will normally be difficult, expensive and time consuming.

One advantage of this invention is that there is provided a means to accomplish such installations on the ground and still achieve the desired objectives including high density packaging for transport in a space shuttle.

SUMMARY OF THE INVENTION

The structural element, also referred to as a "space rail", which accomplishes the foregoing objects comprises a non-deployable part for installation of hardware, and deployable parts to provide the acquired stiffness to an assembly of space rails when in space.

The space rail thus has two basic elements, a box structure (truss beam) which is configured to permit installation of payload hardware and payload services hardware along its length and a deployable back structure which provides stiffness to the assembly when deployed.

BRIEF DESCRIPTION OF THE DRAWINGS

FIG. 1 is a perspective view of the deployable back structure folded in position on the box structure forming a space rail and in launch position;

FIG. 1A is a partial view of FIG. 1A showing a motorized actuator;

FIG. 2 is a view similar to FIG. 1 but showing the back structure partially deployed;

FIG. 3 is the view similar to FIGS. 1 and 2 with the back structure fully deployed;

FIGS. 4A and 4B illustrate the space rails of FIGS. 1-3 forming six space rails in a packaged state for transportation, with FIG. 4A showing one space rail deployed and FIG. 4B showing a fully deployed support system;

FIG. 5 illustrates the platform with antennas, solar arrays and service equipment, originally installed in the box structure, in a fully deployed configuration.

DETAILED DESCRIPTION

Referring first to FIGS. 1, 2 and 3, it can be seen that the space rail 10 of this invention comprises two basic elements: a box structure 12 which is configured to permit installation of payload hardware and payload services hardware along its length, and a deployable back structure 14 which provides stiffness to an assembly of space rails 10 when deployed.

The box structure 12 comprises a flat, relatively long, and rigid parallelogram, preferably rectangular, body member with center trusses 16 located transverse the two longer sides 20 and 22 of the rectangular body member. As shown in FIG. 1, the size of the box structure allows the back structure 14 to be folded and all sides of the box structure and center truss 16 are box-like in cross-section.

The deployable back structure 14 comprises four tubular struts 24A-D each having one end pivotally connected to one side 20 of the box structure 12 and the other ends connected in pairs to a pair of spring loaded hinge mechanism 26 in triangular configurations 28A and 28B. The spring loaded hinge mechanisms 26 are connected together by a fifth tubular strut 30 thus connecting the apices of the two triangles 28A and 28B and forming a base for still another triangle 32. The pivotal connection of the struts 24A-D to side 20 is accomplished in any suitable manner; clevices 34 being shown by way of example. These clevices are located on each end of side 20 and a pair thereof is located centrally near the end of the center truss 16.

A motorized actuator 36 of FIG. 1A can be used to deploy the back structure. The actuator 36, which can be a gear motor, rotates a bar 38 which lifts the longitudinal strut 30. Once started, residual spring load in the hinge mechanisms 26 continues deployment to completion. FIG. 1 illustrates the back structure in its folded or undeployed condition, and FIG. 2 shows partial deployment and FIG. 3 shows the back structure fully deployed. When deployed, the back structure forms two four-sided pyramids with their apices connected by strut 30. As will be apparent hereinafter, struts, like strut 30, will connect with connect hinge mechanism 26 of adjacent space rails when an assembly of space rails is formed.

Each actuator 36 includes legs 40 and 42 and an elbow 44. Legs 40 are each connected at one end to elbows 44 and at other end by clevices 46 to side 22 through universal joints 50. The location of the clevices 46 on side 22 corresponds to the location on the clevices 34 on side 20. Legs 42 are each connected at one end to hinge mechanism 26 via universal joints 52 and at their other ends to elbows 44.

The use of universal joints allows the legs 40 and 42 and elbow 44 to be kept within the confines of the box structure 12. The power mechanism provides the means by which the elbow changes to a straight joint, as shown in FIG. 3, when the back structure 14 is fully deployed.

The actuators 36 are but one form of means for deployment of the back structure. Other forms are to be shown and described hereinbelow.

FIGS. 4A and 4B illustrate the use of the invention in connection with an equipment module 60. In these figures, six equipment space rails 62 (referred to above as an "assembly" of space rails) are pivotally connected as at 64 to the equipment module 60 to form six radially extending equipment space rails to form a platform 66 as shown in FIG. 4B.

FIG. 4A illustrates five space rails in stowed position for launching as in a space shuttle cargo bay and, to illustrate the function of the back structure 14; one back structure 14 is deployed as at 68 while the space rail is still in stowed position and the sixth space rail with its back structure deployed in its final radial position as at 70. The back structure 14, as such, for all space rails are actually a plurality of back structures with struts 30 connected to adjacent space rail hinge mechanisms 26 as alluded to above.

Each space rail is constructed according to the description of, and showing in, FIGS. 1, 2 and 3, except that each back structure 14 is not totally within the confines of any one space rail. In the embodiment shown, the hinge mechanisms 26 and tubular struts 30 are joined together and pivotally connected to an actuator 72. The actuator 72 is also pivotally connected as at 74 to the equipment module 60 and serves to deploy the back structure and the ladders 62.

FIG. 5 is an extension of the concept of FIGS. 4A and B showing the platform 68 comprising the equipment module 60 with six ladders 62 with equipment ("payload hardware and payload service hardware") located along the length of the ladders and connected to the ends thereof. By way of example of such equipment, there are shown four large antennas 76 located on the ends of the ladder, three smaller antennas 80 located within the length of the ladders as well as additional equipment, such as a lightning sensor mapper 82, a low light television 84, imaging spectrometric observatory 86, reflectors 90 and two arrays of solar panels 92 extending radially from the ends of two of the ladders. This Figure also illustrates how equipment may be located on the platform 68, whether the equipment is from one source or several, multi-company, or multi-national, thus solving the "Tower of Babylon" problem.

What is claimed is:

1. A space rail for use in connection with the formation of space systems comprising,
   a relatively rigid planar structure parallelogram frame,
   a deployable back structure fixedly attached to said frame structure and capable of being folded substantially coplanar with said frame structure and deployable to form a pyramid configuration on said frame structure when deployed,
   said space rail being adapted to be connected to similar space rails to form an assembly of space rails with said back structures connected together to provide rigidity to the assembly.

2. The space rail as claimed in claim 1 wherein said frame structure is a rectangle.

3. The space rail as claimed in claim 2 wherein said back structure comprises a plurality of tubular struts pivotally connected to said frame structure and to each other forming triangles when undeployed with a tubular strut connecting the apices of said triangles together.

4. The space rail as claimed in claim 3 further including means for actuating said back structure into a deployed position.

5. The space rail as claimed in claim 4 further including space hardware attached to said frame structure.

6. An assembly of space rails comprising,
   a plurality of relatively rigid planar parallelogram frame structures connected end-to-end, and a back structure comprising a plurality of tubular struts connected together and fixedly connected to said frame structure in such a manner so as to be foldable and substantially coplanar with said frame structure in an undeployed position and capable of forming pyramids as a space rail structure in a deployed position.

7. The assembly as claimed in claim 6 further including,
   an equipment module,
   means for pivotally connecting said space rail to said equipment module, and
   means for deploying said back structure.

8. The assembly as claimed in claim 7 further including means for pivotally connecting a plurality of space rail structures to said equipment module, and
   means for deploying said space rail structures radially from said equipment module to form a platform.

9. The assembly as claimed in claim 8 further including means defining space hardware distributed along said space rail structures and in said equipment module.

* * * * *